United States Patent Office 3,529,333
Patented Sept. 22, 1970

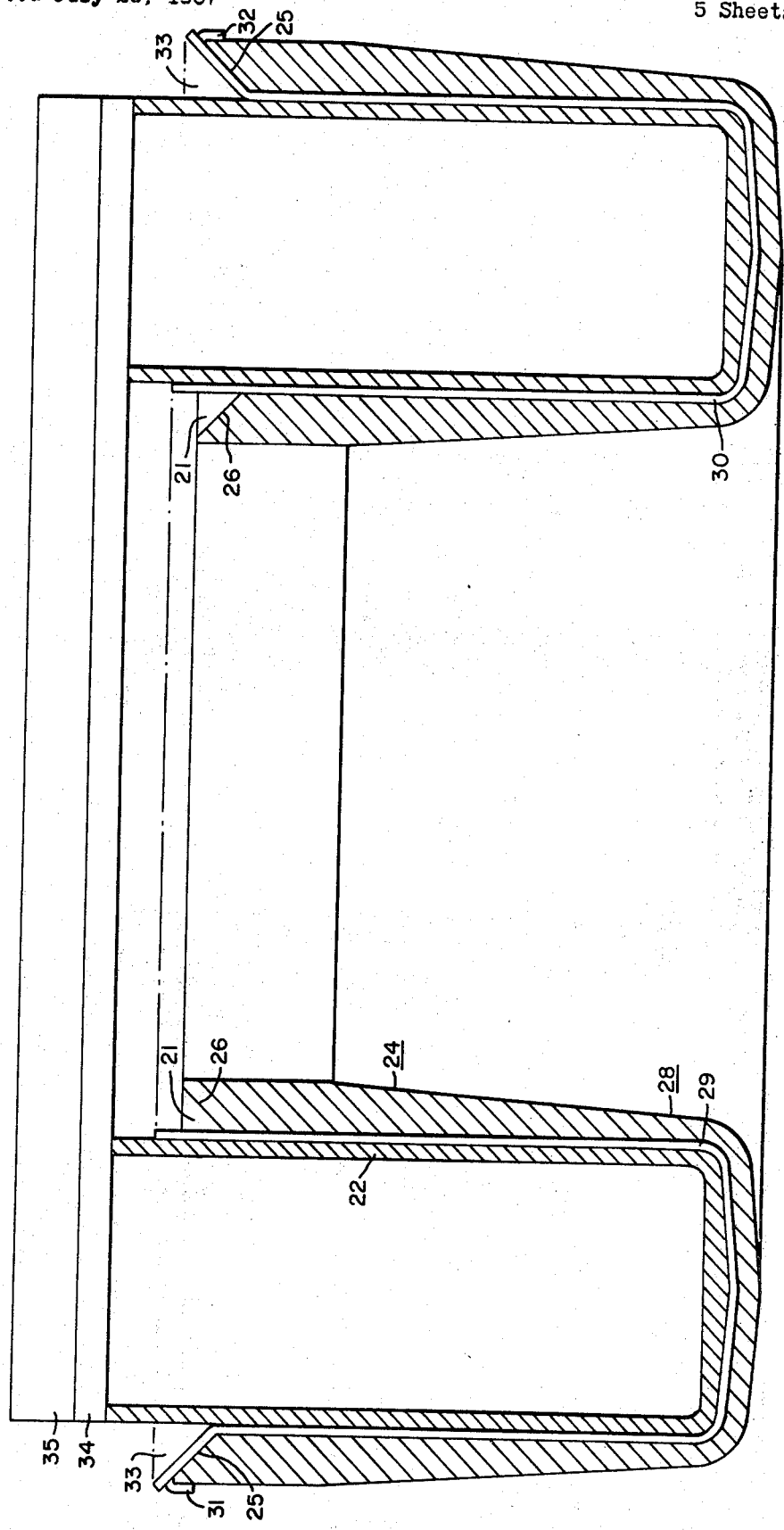

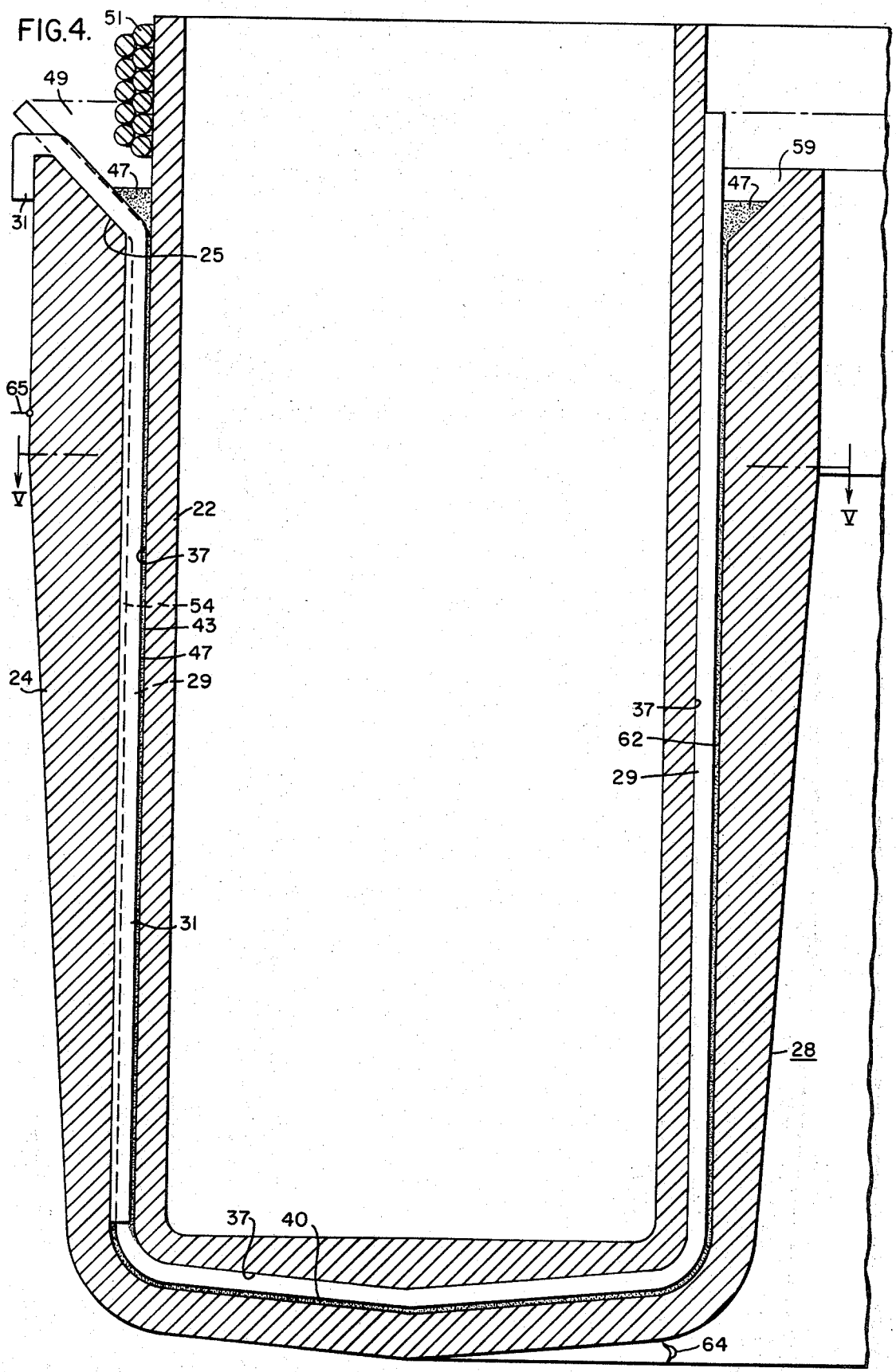

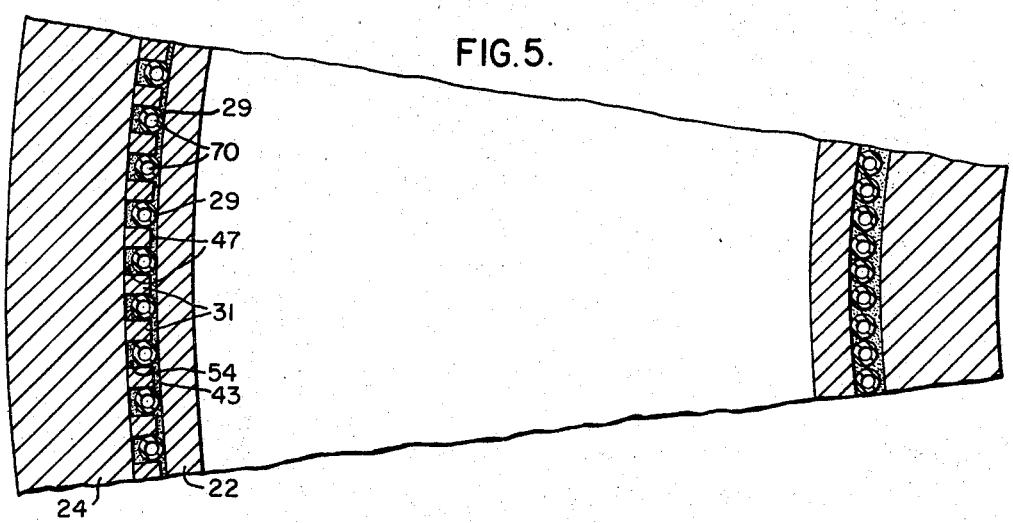
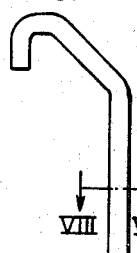
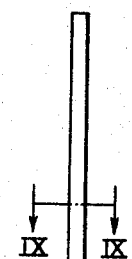
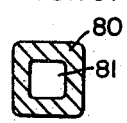

3,529,333
PROCESS FOR PRODUCING AN ELECTRODE TIP
Serafino M. De Corso, Media, George A. Kemeny, Export, and Charles B. Wolf, Irwin, Pa., assignors to Westinghouse Electric Corporation, Pittsburgh, Pa., a corporation of Pennsylvania
Filed July 26, 1967, Ser. No. 656,196
Int. Cl. H01j 9/00
U.S. Cl. 29—25.14                            31 Claims

ABSTRACT OF THE DISCLOSURE

The process includes forming a first generally annular shell, generally U-shaped in cross-section, of a material having high thermal conductivity and high electrical conductivity, forming a second generally annular shell generally U-shaped in cross-section, the dimensions of the second shell being such that the second shell may be inserted in the first shell while leaving annular spaces between the side walls of the first shell and the adjacent side walls of the second shell and also leaving an annular space between the bottom of the first shell and the bottom of the second shell, disposing at spaced intervals around the periphery of the first shell and within the first shell a plurality of radially extending generally U-shaped tubes which are to carry cooling fluid, thereafter inserting the second shell within the annular space formed between the axially extending portions of the plurality of tubes with corresponding axially extending portions of all the tubes being between the annular wall of smaller diameter of the second shell and the annular wall of smaller diameter of the first shell, and the other corresponding axially extending portions of all of the tubes being between the annular wall of larger diameter of the second shell and the annular wall of larger diameter of the first shell, thereafter filling the spaces between the tubes and the first and second shell with a molten brazing compound which solidifies and forms with the first and second shells and the tubes a unitary structure in which the first or outer shell and the second or inner shell and the tubes are essentially formed integrally with each other. The process may include the use of spacers to space the tubes at peripherally spaced intervals between adjacent walls of larger diameter of the shells.

CROSS REFERENCE TO RELATED APPLICATIONS

A tip which may be produced by this process is described and claimed in a copending application of S. M. De Corso et al. for "Improved Electrode and Electrode Tip for Use Therein," Ser. No. 440,425, filed Mar. 17, 1965, now Pat. No. 3,368,018 and assigned to the assignee of the instant invention.

FIELD OF THE INVENTION

The invention relates to a new and improved process for producing an electrode tip having a plurality of passageways therein for the flow of a cooling fluid.

DESCRIPTION OF THE PRIOR ART

A number of prior-art patents have been issued, some dealing rather remotely with a problem similar to that which the subject inventors encountered and overcame by the process of their invention. Those patents include No. 2,848,411 issued Aug. 19, 1958, to Hartzell for "Electrode"; Pat. No. 1,162,340 issued Nov. 30, 1915, to Coolidge for "Method of Uniting Metals"; Pat. 3,152,373 issued Oct. 13, 1964, to Einthoven et al. for "Method of Manufacturing Semiconductor Devices"; Pat. 2,381,625 issued Aug. 7, 1945, to Stewart for "X-Ray Tube Anode Seal"; Pat. 2,807,435 issued Sept. 24, 1957, to Howlett et al. for "Turbine Stator Blade"; and Pat. 2,106,590 issued Jan. 25, 1938, to Boegehold et al. for "Bearing and Method." The manners in which the disclosures of these patents differ from the invention disclosed herein will become increasingly apparent after a detailed description of the invention.

SUMMARY OF THE INVENTION

In our preferred process we form first and second shells, at least the first shell being composed of a material having high electrical and high thermal conductivity, each of the shells being generally annular in shape and generally U-shaped in cross-section, the dimensions of the second shell being such that it may be inserted in the first shell while leaving annular spaces between all adjacent walls of the two shells and an annular space between the bottom of the second shell and the bottom of the first shell. A large number of generally U-shaped radially extending hollow conduits are then mounted in the first shell at spaced intervals around the entire periphery thereof. Spacers of high thermal conductivity material may be inserted between adjacent conduits at the outer portions thereof. The second shell is then mounted within the annular space defined by the axially extending portions of the U-shaped conduits. Braze material is added either in solid form after which the shells and braze material are heated together until the material melts and flows into the spaces, or after liquefying, and thereafter allowed to cool and solidify, forming an integral tip structure.

BRIEF DESCRIPTION OF THE DRAWINGS

To illustrate steps in the process a number of drawings are provided in which:

FIG. 3 is a view of the inner shell disposed within the outer shell, showing two of the fluid flow conduit tubes in position between the inner and outer shells, and showing the end portions of two spacer units behind the two conduit tubes.

FIG. 4 is a view of the left-hand portion of the tip of FIG. 3, partly in a plane back of the cross-section of FIG. 3, in which the spacer is seen in elevation with the conduit to the rear thereof being shown in dashed line, and the spaces which ultimately will be filled with braze material being shown;

FIG. 5 is a cross-section through the lines V—V of FIG. 4 showing the inner and outer shells, the conduit pipes, the spacers therebetween, and the flux which may be added for brazing purposes; the flux may be eliminated by brazing in a controlled atmosphere, i.e., a reducing atmosphere;

FIG. 6 is an elevational view of a suitable spacer for use in the process illustrated in FIG. 4;

FIG. 7 is an elevational view of a suitable conduit pipe or tube, generally U-shaped, suitable for use in making the electrode tip and suitable for use in the process illustrated in FIG. 4;

FIG. 8 is a cross-section through the spacer of FIG. 6 showing the solid construction thereof and showing a spacer according to one suitable configuration thereof;

FIG. 9 is a cross-section through the conduit of FIG. 7, showing the solid portion of the conduit and the inner passageway through which cooling fluid flows;

FIG. 10 is a view of an additional conduit configuration which may be used as a substitute for that of FIG. 9, the conduit of FIG. 10 being substantially square in dimensions and having a substantially square passageway therethrough for the flow of cooling fluid;

FIG. 11 is a further view of an additional suitable pipe or tube configuration which may be substituted for the pipe of FIG. 9, and in which the pipe or conduit is shown to be rectangular in shape and to have a rectangular fluid flow passageway therethrough;

DESCRIPTION OF THE PREFERRED EMBODIMENTS

Figure 1:
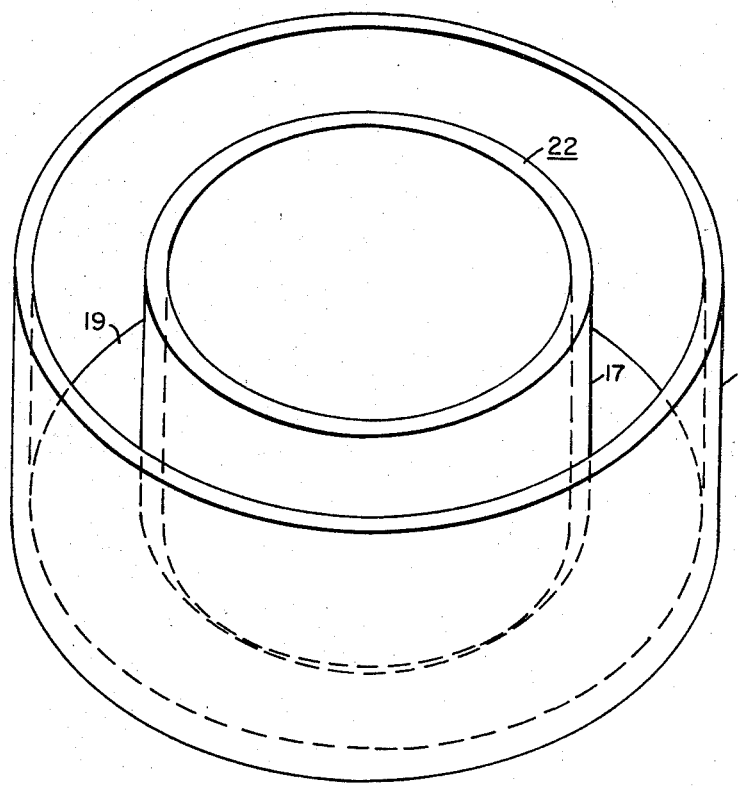
FIG. 1 shows a view of the inner shell of the tip, referred to hereinabove as the second shell.

The drawings aforementioned illustrate various stages in the processes of constructing the tip. As will be readily understood by those skilled in the art, a number of alloys may be employed for brazing, the selection of a proper alloy depending upon considerations of the melting point of the alloy, the extent to which the alloy dissolves copper, in those cases where the shells and conduits are composed of copper, and on the thermal conductivity of the brazing alloy. If, as is frequently the case, in constructing an electrode tip according to the process described, the tip structure is composed of copper or a copper alloy, in one process it is required that the brazing alloy have a melting point considerably below that of copper. The selection of a suitable brazing alloy to have this characteristic offers no difficulty since most common brazing alloys melt below 1500° F., while copper melts at 1981° F. On the other hand, alloys with a very low melting point, for example a soft solder alloy, are not suitable, not only because these alloys have a very low thermal conductivity, but most importantly because during normal operation of the electrode the temperature in the areas where the braze is located may be in the range of 600° to 1000° F., and in this temperature range the low melting point alloys would be in a liquid form or condition.

Another requirement for the alloy which will be readily recognized by those skilled in the art is that in the time required for the alloy to flow into the spaces between the tubes or conduits and the shell structure and to fill all voids, the alloy cannot be allowed to dissolve an excessive amount of copper. Obviously if an alloy were chosen which dissolved copper at too high a rate, the alloy would eat through the copper tube walls and these tubes would then fill with alloy and thus be unable to pass a cooling fluid such as water. It has been found that most of the low temperature brazing alloys do not dissolve copper at an excessive rate. It has been found in practice that the most satisfactory alloy, one known in the trade as BT braze, which is the copper-silver eutectic, the chemical ingredients of which are set forth in a table hereinafter, dissolves copper at a significant rate. With this alloy, and particularly if brazing fluxes are used which enhance dissolving, it becomes necessary to expose the copper structure to the liquid braze only for a relatively limited period of time. With BT alloy this exposure should be limited to less than ten minutes and preferably less than five minutes.

Preferably the electrode tip structure is made out of copper or copper alloys because these metals have very high thermal conductivities which allow the safe removal of high heat fluxes encountered in operating the electrode tip on an electrode in furnace operation.

On the other hand, if the brazing alloy has a relatively low thermal conductivity the whole purpose of using a cuprous structure is defeated. Inasmuch as heat flows through the outer copper shell through the braze to the tubes and thence to the water or other coolant, it is desired to have as small a temperature drop through the braze areas as is possible. This condition is obtained by having thin braze areas and by using braze materials of high thermal conductivity. The higher the thermal conductivity of the braze material, the thicker a joint can be allowed to become. The following list gives the chemical ingredients of certain braze alloys, their rough melting points or melting points or melting range, and an estimate of their thermal conductivity with the thermal conductivity of copper assumed at 100%. (Actually the table lists percent of electrical conductivity wih copper a 100%, but electrical conductivity percentage gives a good estimate of thermal conductivity percentage.)

TABLE I

| Alloy | Cu percent | Ag percent | Zn | Other | Melting Point or Range, °F. | Conductivity, percent |
|---|---|---|---|---|---|---|
| (1) BT alloy | 28 | 72 | | | 1,435 | 84 |
| (2) Easy flow 45 | 15 | 45 | 16 | 24 Cd | 1,125–1,145 | 29 |
| (3) Easy flow 3 | 15.5 | 50 | 15.5 | 16 Cd, 3 Ni | 1,170–1,270 | 20 |
| (4) PDS 1855 [1] | 34 | 50 | 16 | | 1,250–1,425 | 25 |

[1] Handy & Harman Braze ETX.

It appears that based on thermal conductivity, alloy number one, BT alloy, is by far the most desirable alloy, and this alloy is frequently employed in practice. For applications where the heat flux is not too drastic, an alloy identified as alloy number two and known in the trade as "Easy Flow 45" is another alloy which may be employed.

Figure 2:
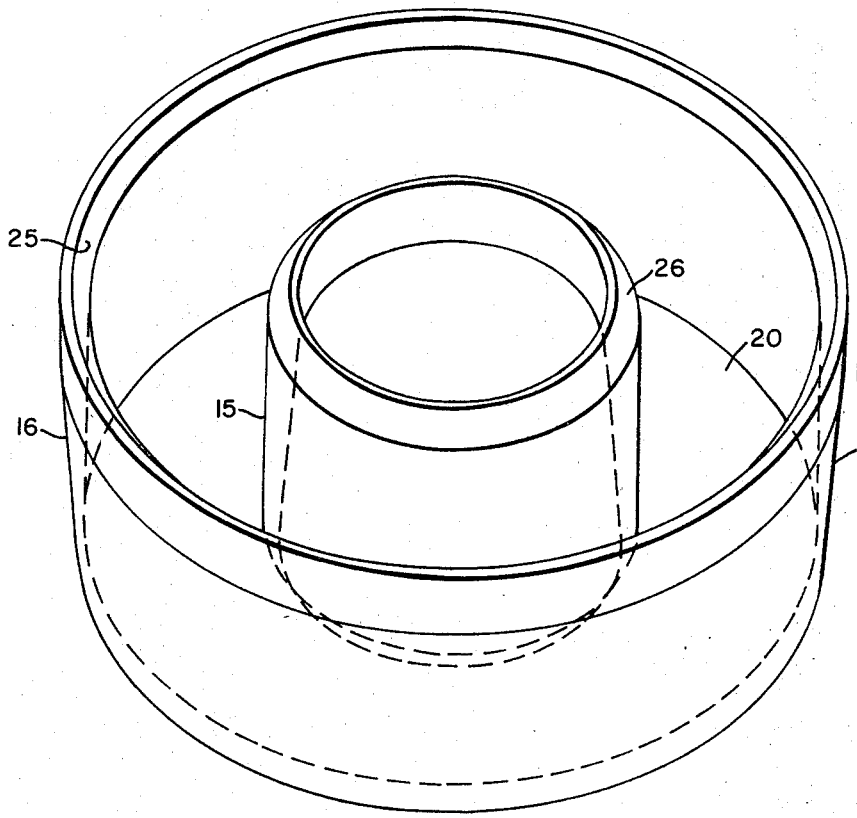
FIG. 2 shows a view of the outer shell of the tip referred to hereinabove as the first shell.

In FIG. 1 an inner shell which may be formed as a first step in the process is shown and is generally designated 22. It has substantially cylindrical axially extending inner and outer walls 17 and 18 respectively and an annular substantially flat bottom 19. In FIG. 2 an outer shell which may be alternatively formed as another initial step in the process is shown and is generally designated 24. It has inner wall 15, outer wall 16, and bottom 20. Outer shell 24 has a portion of the upper end or upper wall surface 16 thereof sloping at 25 and corresponding with the sloping surface portions 25 of FIG. 3. In addition, the outer shell of FIG. 2 has an additional tapering surface 26 on inner wall 15 corresponding to the tapering surface 26 of FIG. 3. Where no flux is to be employed in the brazing process, tapering surface 26 may not be needed.

In FIG. 3, to which particular attention is directed, the outer shell is shown generally designated 24, the inner shell is shown generally designated 22, and two generally U-shaped conduits are shown in position between the shells, one of these pipes or conduits being designated 29 and the other pipe or conduit being designated 30. The tip is generally designated 28. Portions of two spacers such as those employed between conduits are shown with their ends bent over the aforementioned slanting surface 25. These spacer elements are designated 31 and 32. For clarity of illustration and to illustrate a step which may be taken in the process to be described hereinafter in detail an asbestos ring 34 is shown covering the entire area covered by the annular inner shell, U-shaped in cross-section, the asbestos ring 34 being covered by a weight 35 composed of suitable material.

In FIG. 4 to which particular attention is directed further structural details present at a stage of the process to be described are shown.

With further particular reference to FIG. 4, it is seen that FIG. 4 differs from FIG. 3 in that the cross-section selected for illustration shows in full elevational view the spacer member 31. As shown, the spacer member 31 may not tightly engage the adjacent wall of inner shell 22 and may not completely fill the gap 37 which may be purposely left between the outer wall of the inner shell, and the inner wall of the outer shell 24. This aforementioned gap or space, except as the space is occupied by conduits 29 and spacers 31, is shown as being filled with flux 47, the space to ultimately be filled with braze material. Furthermore in forming the structure it may prove impossible or undesirable that the conduits 29 closely fit both the inner shell and the outer shell. Accordingly, in FIG. 4 a space designated 54 is shown existing between the conduit 29, shown in part in dashed outline, and the adjacent inner wall of the outer shell 24. Furthermore, the aforementioned space between the conduit 29 and the adjacent wall of the outer shell may extend substantially around the entire electrode tip, which is generally U-shaped in cross-section, this space at the bottom of the tip being designated 40 and being shown as filled with a flux compound. As previously stated both the conduit 29 and the spacer member 31 have at the upper ends thereof on the outside of the shells a sloping portion in effect forming a trough 49 between the conduits and spacers and the outer wall of the inner shell 22. In FIG. 4 a certain amount of flux 47 is shown as being deposited in the trough 49 and as shown this flux extends down the aforementioned space 43 between the spacer and the outer wall of the inner shell and furthermore near the bottom of the view the flux 47 is shown as extending into and filling any space which exists between conduit 29 and the adjacent inner wall of the outer shell 24. In like manner on the other side of the annular tip member, generally U-shaped in cross-section, there is shown a deposit of flux 47 deposited in the trough 59, and it will be understood that the flux 47 extends down and fills any space existing between the tubes, and the inner wall of the outer shell 24, and the outer wall of inner shell 22, such as space 62. In FIG. 4 spacer element 31 has been shown in full elevation, whereas on the right-hand side of FIG. 4 the conduit 29 is visible in a full elevational view. There are no spacers generally on the right-hand side of FIG. 4. Here the tubes are adjacent. On the inside diameter, the tubes touch; on the outside diameter, the space between tubes is filled with spacers. There is a spacer, not visible, to the rear of conduit 29, on the outside diameter of the tip. These spacers may not closely fit the outer wall of the inner shell 22 and the flux 47 may flow down cracks or spaces between the aforementioned spacers and the outer wall of inner shell 22 to provide for brazing the entire structure into a unitary, integral assembly in a manner to be described hereinafter. Though the flux has been shown filling all voids, it should be understood that the flux may only flow into their locations after it has liquefied during the brazing operation.

Figure 13:
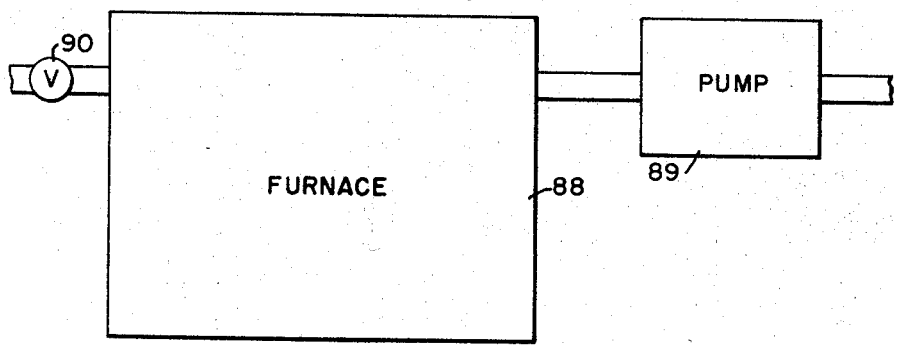
FIG. 13 is a view of a furnace suitable for practicing the process according to one embodiment of the invention, in which the shells, spacers and conduits are heated in the same furnace in which brazing compound is heated. As will be apparent from the study of FIG. 3, the atmosphere of the furnace may be controlled and may be if desired evacuated by the pump shown.

In FIG. 4 the braze material 51 may consist of turns of the aforementioned alloy BT; in the process of constructing an electrode tip in accordance with the illustration of FIG. 4 the itp and the alloy are placed in one furnace, FIG. 13, where the temperature is brought up to a temperature which at least melts the brazing alloy 51. The melted or liquefied alloy 51 thereafter flows into all of the spaces between the conduits and the shells, all of the spaces between spacers and the shells, all the spaces between tubes and spacers, and any unoccupied space between spacers. Since a brazing flux 47 is employed it is desirable that after the structure has become heated this BT alloy should complete the filling of all spaces in not over ten minutes and preferably less than five minutes to avoid substantial dissolving of the copper structure of the outer and inner shells, the conduits, and the spacers. The considerations which are to be taken into account in fixing the time which the braze material can be allowed to act on the copper are set forth hereinabove.

For clarity of illustration an arc 64 is seen taking place from the electrode tip 28 of FIG. 4. For further clarity illustration, a lead 65 is shown connected to the outer shell 24 for bringing current to produce and sustain the arc 64, but it will be readily understood that in actual practice the supporting structure of the electrode contains at least a portion composed of electrically conductive material which extends from the tip to substantially the upper end of the electrode, and that this portion of conducting material is connected to a source of potential and brings current to the tip to produce and sustain an arc. Arc 64 may take place to any surface of opposite polarity, which may be the melt of a furnace or which may be another electrode.

Particular reference is made now to FIG. 5, a cross-sectional view in fragmentary form through the line V—V of FIG. 4. It is seen from FIG. 5 that even though the conduits 29 are carefully chosen or made as to dimensions, the conduits 29 having fluid flow passageways 70 therein, and even though the spacers 31 are carefully chosen or made as to dimensions, nevertheless a small space 43 may exist between the spacers and the adjacent wall of the inner shell 22 around the outside diameter of the tip, that is, the annular space of greater diameter between the inner and outer shells of the tip, and that spaces 54 may exist between the conduits 29 and the adjacent wall of the outer shell 24. The spacers between tubes, spacers and walls need not necessarily be uniform or shown. For example, some spacers may touch the outer wall 24, others may touch the inner wall 22. As will be seen hereinafter spaces, which may originally be filled with flux 47 during the brazing process, become filled with a molten alloy which forms a bond with the copper of the adjacent conduits and the adjacent inner and outer shells, in effect forming a completely integral structure such as that shown in FIG. 12 where the composite braze which is ultimately attained as a final result of the process is shown and wherein it is shown that for all intended purposes the identity of the conduits and the identity of the spacers have disappeared, and in effect the electrode tip consists of one annular shell U-shaped in cross-section having inner and outer portions and having a series of spaced U-shaped passageways therearound for the flow of cooling fluid, the inner and outer portions of the tip resulting from brazing being identified as 71 and 72 and the fluid flow passageways therethrough being identified as 73 in FIG. 12. As previously stated the integral structure is the result of a brazing process and merely for the purposes of easy identification the area of FIG. 12 in which the brazing process took place is identified as 74, but it is to be understood that after brazing this area for all intents and purposes is completely integral with the outer shell portion, the inner shell portion and the conduits. To further clarify steps in the process of obtaining the ultimate product reference is had to FIG. 6 which shows in vertical elevation a spacer member 31; to FIG. 7 which shows in vertical elevation a conduit 29; to FIG. 8 which shows a cross-section through the spacer member 31 of FIG. 6 further illustrating that the spacer member is preferably of solid construction; to FIG. 9 which is a cross-section along the lines IX—IX of FIG. 7 showing the conduit 29 and the fluid flow passageway 70 therethrough; to FIG. 10 illustrating a suitable conduit having a different shape, in effect a square shape, the conduit of FIG. 10 being designated and the fluid flow passageway therethrough being designated 81; and to FIG. 11 which illustrates in cross-section a still further configuration of a suitable conduit which is rectangular in cross-section, the conduit of FIG. 11 being shown at 85 and the fluid flow passageway therethrough being shown at 86.

According to our invention, although there are several different processes disclosed or revealed herein, these processes may generally be grouped into two classes. In one class of processes the shells with the conduits and spacers disposed therein at their desired positions, and with brazing material and in some cases flux in place in or on the shells, are placed in a furnace shown in block form in FIG. 13 at 88. The atmosphere of the furnace 88 may be controlled if desired, the pump generally designated 89 connected to the furnace and shown in block form being provided for this purpose. The term "control of the atmosphere" as employed herein includes providing a reducing atmosphere and also includes the term "evacuation," so that pump 89 if desired may be of a type which evacuates at least a portion of the gas from inside the furnace 88 forming at least a partial vacuum therein. To this end a valve 90 is shown in the intake of air or other gas to the furnace 88. Means, not shown for convenience of illustration, may be used for adjusting and indicating the temperature in furnace 88.

Figure 14:
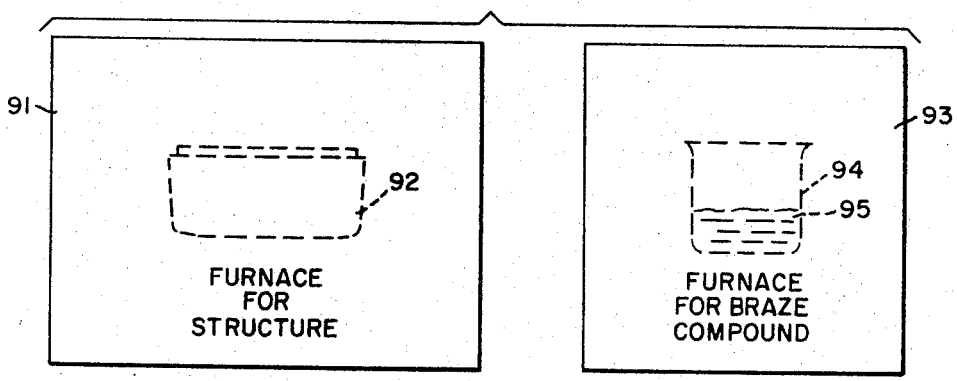
FIG. 14 is a view of two furnaces suitable for practicing the process according to another conception of the invention, in which the structure and the braze compound are heated separately, and the braze compound after being heated to its melting point and after liquefying is poured into the structure and allowed to harden to form a substantially integral electrode tip.

The second group of processes for practicing our invention, generally speaking, involves heating the structure of the tip including the inner and outer shell portions, spacers and conduits in a furnace to a predetermined temperature a furnace suitable for this purpose being shown in FIG. 14 and designated 91. The shell structure is shown disposed in the furnace 91 in dashed outline at 92. An additional furnace 93 shown in block form is provided for heating the braze compound, the container for the braze material to be heated being shown in dashed line at 94, the braze material itself being designated 95.

In practicing the process of our invention according to structure illustrated in FIG. 14, the inner and outer shells, the conduits and the spacers are carefully placed in position and in accordance with the material of which these components are constructed, the temperature of furnace 91 is adjusted by means, not shown, to bring the structure therein to a predetermined substantially uniform temperature. Where the shells, conduits and spacers are composed of copper the temperature of furnace 91 will not be allowed to reach the melting point of copper, which has been stated heretofore as being of the order of 1981° F. Means, not shown, is provided for adjusting the temperature of the furnace 91, and means not shown for convenience of illustration is provided for indicating the temperature in furnace 91. Likewise, means not shown for convenience of illustration is provided for adjusting the temperature in furnace 93, and means not shown for convenience of illustration is provided for indicating the temperature in furnace 93. Depending upon the composition of the braze material 95 in furnace 93 the braze material is melted and allowed to liquefy throughout so that it will readily flow into the cracks and spaces in the structure 92. Depending upon the temperature to which the structure 92 has been heated and depending upon the composition of the braze compound 95 and the temperature to which it has been heated after melting, braze material 95, where it is not desired to use any flux, is poured into the troughs 33 and/or 21 of FIG. 3 or if it is desired to use a flux such as flux 47 of FIG. 4, a braze material may be poured into the trough 49 and/or the trough 59. It will be understood that where the invention is practiced in accordance with FIG. 14 that braze material 51 wound around the inner shell, FIG. 4, is omitted when the shell structure is placed in the furnace 91, since it is contemplated that molten braze material will thereafter be added to fill up all of the aforementioned spaces between the conduits and the shells, between the spacers and the shells, and between the spacers and the conduits.

In practicing the process of our invention according to FIG. 13 let it first be assumed by way of illustration that no attempt is made to control the atmosphere in furnace 88, the valve 90 is opened and the pump 89 is shut off. A complete shell structure corresponding to that of FIG. 4 to which flux has been added, and to which braze material has been added, is inserted in the furnace 88. It will be understood that the furnace 88 contains means for adjusting and controlling the temperature thereof, these means not being shown for convenience of illustration, and furthermore the furnace 88 contains means for indicating the temperature inside the furnace, the last-named means not being shown for convenience of illustration, any suitable means being provided. The structure within furnace 88 is then brought to a temperature which melts the braze material 51 but does not melt the material of the conduits 29 or of the inner and outer shells 22 and 24. In a previous full discussion of suitable braze materials it has been brought out that most braze materials melt and liquefy at a temperature considerably below the temperature at which copper melts or liquefies. If the inner and outer shells are composed of copper, and the conduits and spacers are composed of copper, the selection of a braze material for use at 51 offers no particular problems other than that it is preferable to select a braze material having a high thermal conductivity, and it is preferable to select a braze material which will produce only little dissolving of the copper exposed to the braze material within the time that the tip and the braze material are within the furnace and heated to the temperature therein, and which is insufficient to melt or dissolve a hole in any of the copper conduits 29, as previously explained. The furnaces 88, 91 and 93 have means not shown for convenience of illustration for timing the period during which either a structure or a braze material is maintained in the furnace at or above a predetermined temperature.

Figure 12:
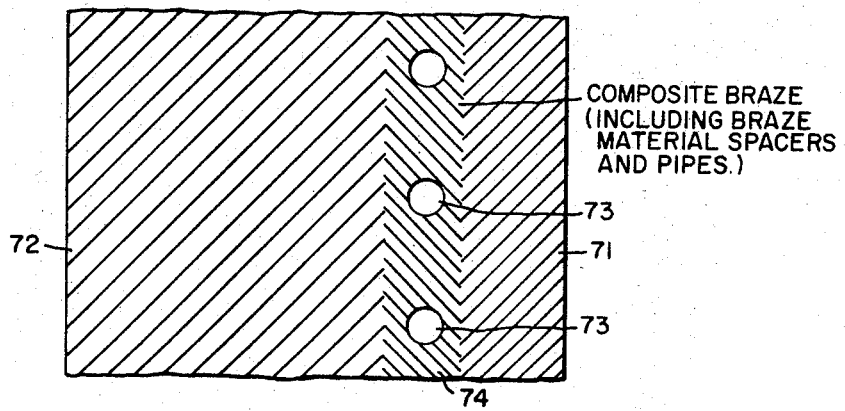
FIG. 12 is an enlarged fragmentary view of a portion of the inner and outer shells and the conduits or tubes after the brazing process is completed, and illustrating the substantially integral construction of the electrode tip which results from the brazing process.

As a result of the aforedescribed process described in connection with the furnace 88 of FIG. 13 a substantially integral structure is formed between the inner and outer shells, the conduits and the spacers of FIG. 4, this integral structure resembling the integral structure of FIG. 12. As previously stated a number of considerations are taken into account in selecting the braze material to be employed. As will be seen from an examination of FIG. 4 a certain amount of the braze material gets into a space or crack between the conduit which carries the cooling fluid and the adjacent outer shell which forms part of the electrode tip. If high heat fluxes are to be conducted from the electrode tip the braze material must have high thermal conductivity. Preferably braze materials are selected with this in mind. Furthermore, the braze material must have a melting or liquefying temperature less than that of the material of the shells, conduits and spacers. Where the shells, conduits and spacers are composed of copper, such a selection offers no difficulties since the melting temperature of copper is about 1900° F. while the melting temperature of most alloys suitable for brazing is at least several hundred degrees below this valve. On the other hand it is desirable that the brazing material should form a good bond with the copper which it comes in contact with.

As previously stated our invention contemplates that the final product will be inner and outer shells, conduits, and spacers so brazed together that for all intended purposes an integral, unitary structure is produced. Such a structure is shown in FIG. 12.

As will be readily understood, after the brazing compound has cooled it may be desirable to machine the entire structure to remove excesses of the brazing compound and to insure a smooth walled tip structure of uniform dimensions throughout, and to provide means for attaching the electrode tip to structural members.

In addition to spacing the tubes or conduits of the assembly from each other the spacers 31 perform two additional functions; they minimize the quantity of braze compound which has to be used; they increase the thermal conductivity of material in the previously existing voids or spaces between the tubes and the spacers and between the walls of the shells. As previously stated, during placing of the molten braze compound the inner shell of FIG. 3 will tend to float and has to be held down either by a pre-placed weight or by mechanical fastening of inner shell to outer shell. Additionally summarizing, the mode of braze introduction may be, (1) heating in air with suitable fluxing, (2) heating in a furnace with a controlled atmosphere with or without fluxing, and (3) heating in a vacuum without fluxing.

As stated above a number of possible braze compounds are suitable for use in practicing the invention, and generally their thermal conductivities are proportional to their electrical conductivities following the Wiedemann-Franz law.

As previously stated a number of brazing materials have been successfully used in practice and these include Easy Flow 45 and the brazing compound known as BT. It has been found in practice that the brazing compound known in the trade as BT yields a higher conductivity structure, that is thermal conductivity, but that it is more difficult to cast the completed product using BT as a brazing compound without puncture of the conduits. This would appear to follow naturally from the fact that the melting point of the BT alloy is in the order of 1435° F., which is not very far below the melting point of copper employed in the conduits, the spacers and the shells, whereas other brazing compounds listed in the chart heretofore inserted in the specification have somewhat lower melting points.

No particular apparatus is required for assembling the inner and outer shells or placing the conduits therein and for placing spacers therebetween as shown in FIG. 3 and in FIG. 4. All of the required steps may be accomplished by hand if desired. No particular apparatus is required for introducing the braze compound into the structure and any suitable furnace may be employed at 88 in FIG. 13. Likewise in the process of our invention which is partially illustrated in FIG. 14, no particular apparatus is required for heating the assembly of inner and outer shells, conduits and spacers to a predetermined temperature, any suitable heating means being indicated by the reference numeral 91, and no particular furnace is required for heating the braze compound and bringing the braze compound to a molten condition throughout, any suitable means being, if desired, substituted for the furnace shown at 93 in FIG. 14. The steps in the processes of our invention may be carried out entirely by hand and no particular apparatus is required.

In the claims, the term "diameter" is used in the frame of reference of FIGS. 1 and 2. The inside annular wall of the inner shell has a larger diameter than the inside annular wall of the outer shell; the outside annular wall of the inner shell has a smaller diameter than the outside annular wall of the outer shell.

Whereas the process has been described with respect to copper shells, copper conduits, and copper spacers, it will be understood that other electrically conductive metals preferably having high thermal conductivity could be employed.

The use of spacer elements such as 31 and 32 is the preferred way to space the conduits at peripheral intervals between the outer walls of the two shells and in radial positions, because it is the cheapest; the copper of the spacers is a much cheaper material than the brazing compound, which would have to fill additional space if spacers are not employed.

Other ways of maintaining the conduits in radial positions at periphery spaced intervals until the brazing is completed will occur to those skilled in the art, such as shallow grooves cut in the outside surface of the wall of larger diameter of the inner shell, or shallow grooves cut in the inside surface of the wall of larger diameter of the outer shell; cementing; point or tip soldering; or making one extended portion of every other conduit with two or more small oblique angular bends.

The shells may have a shape in cross-section similar to that of a truncated triangle, if desired, and the tubes or conduits have similar shapes.

The foregoing written description and the drawings are illustrative only and are not to be interpreted in a limiting sense.

We claim as our invention:

1. A process for producing an eletcrode tip which comprises forming in selected order two shells, an inner shell which is generally annular in shape and generally U-shaped in cross-section and having preselected diameters for its inner and outer annular walls, an outer shell which is generally annular in shape and generally U-shaped in cross-section and which has preselected other diameters for its inner and outer annular walls, at least one of said shells being composed of electrically conductive material, thereafter placing a plurality of radially disposed generally U-shaped hollow conduits in the outer shell, the conduits extending at spaced intervals around substantially the entire periphery of the outer shell, the inner shell having such dimensions that it will fit in the annular space formed within said plurality of conduits, placing the inner shell in the annular space formed within said plurality of conduits in close engagement with the plurality of conduits, thereafter brazing the inner and outer shells and the conduits together with molten brazing material which flows into substantially all of the spaces between the conduits and adjacent walls of the shells, and thereafter allowing the braze material to harden and form of the inner and outer shells and the conduits a substantially integral unified structure.

2. The process according to claim 1 including the additional step of adding spacers between each adjacent two conduits before brazing, the spacers being located adjacent the portions of the conduits which lie between the wall of larger diameter of the inner shell and the wall of larger diameter of the outer shell.

3. The process according to claim 2 in which the shells, conduits and spacers are heated to a predetermined temperature less than the melting point of the material of which the shells, conduits and spacers are composed, a brazing compound is separately heated to another temperature at which the brazing compound is liquefied, said other temperature being less than the melting temperature of the material of which the shells, conduits and spacers are composed, thereafter channeling the brazing compound into the spaces between shells, spacers, and conduits, and allowing the brazing compound to remain in a liquefied condition for a predetermined period of time sufficient to allow the brazing compound to substantially fill all of said spaces but insufficient for the brazing compound to substantially dissolve the material of the shells, conduits and spacers, and thereafter cooling the entire structure to prevent further dissolving by the brazing compound, to solidify the brazing compound and form a substantially unitary integral structure of the shells, the conduits, the spacers and the brazing material.

4. A process according to claim 1 in which the brazing material is additionally characterized as being an alloy composed of substantially 28 percent copper and substantially 72 percent silver.

5. The process according to claim 1 in which the brazing material is an alloy composed of substantially 15 percent copper, substantially 45 percent silver, substantially 16 percent zinc, and substantially 24 percent cadmium.

6. The process according to claim 1 in which the brazing material is an alloy composed of substantially 15.5 percent copper, substantially 50 percent silver, substantially 15.5 percent zinc, substantially 16 percent cadmium, and substantially 3 percent nickel.

7. The process according to claim 1 in which the brazing alloy is composed of substantially 34 percent copper, substantially 50 percent silver, and substantially 16 percent cadmium.

8. The process according to claim 1 in which the material of which the shells and conduits are composed has a high thermal conductivity substantially that of pure copper, and in which the braze material is additionally characterized as high a high thermal conductivity substantially 84 percent of that of pure copper.

9. The process according to claim 1 in which the inner and outer shells and the conduits are additionally characterized as being composed of cuprous material, and the brazing material is additionally characterized as being raised to a sufficient molten temperature and being allowed to remain in the spaces of the tip in molten form for a sufficient period of time whereby the brazing material forms a bond with the cuprous material of the inner and outer shells and the conduits, but the extent of dissolving the cuprous material is insufficient to produce a hole in any of the conduits.

10. A process according to claim 1 in which the conduits are additionally characterized as being substantially round in cross-section and having substantially round fluid flow passageways therethrough.

11. A process according to claim 1 in which the conduits are additionally characterized as being substantially square in cross-section and having square fluid flow passageways therethrough.

12. A process according to claim 1 in which the conduits are additionally characterized as being substantially rectangular in cross-section and having rectangular fluid flow passageways therethrough.

13. A process according to claim 1 including the additional step before brazing of adding solid spacers between adjacent pairs of conduits.

14. A process for producing an electrode tip comprising the steps of forming inner and outer shells, both of the shells being generally annular in shape and generally U-shaped in cross-section, the diameter of the inner annular wall of the inner shell being greater than the diameter of the inner annular wall of the outer shell the diameter of the outer annular wall of the inner shell being less than the diameter of the outer annular wall of the outer shell, producing a shell assembly by disposing a plurality of radially extending hollow conduits at spaced intervals around the periphery of the inside of the outer shell, each of the conduits being substantially U-shaped, the conduits being placed around substantially the entire periphery of the outer shell, inserting the inner shell within the annular space formed within the conduits, and brazing the entire assembly to form an integral tip structure.

15. A process according to claim 14 including the additional steps of attaching the braze material to the shell assembly, putting the shell assembly with the attached braze material in a furnace, and controlling the atmosphere and temperature of the furnace.

16. A process according to claim 14 including the additional step of putting the shell assembly and braze material in a furnace, thereafter at least partially evacuating said furnace, and thereafter raising the temperature within the furnace to one at which the braze material melts and is liquefied but less than the melting temperature of the material of which the assembly is composed.

17. The process according to claim 14 in which the braze material is an alloy composed of substantially 28 percent copper and substantially 72 percent silver.

18. The process according to claim 14 in which the braze material is an alloy composed of substantially 15 percent copper, substantially 45 percent silver, substantially 16 percent zinc, and substantially 24 percent cadmium.

19. The process according to claim 14 in which the braze material is an alloy composed of substantially 15.5 percent copper, substantially 50 percent silver, substantially 15.5 percent zinc, substantially 16 percent cadmium, and substantially 3 percent nickel.

20. The process according to claim 14 in which the braze material is an alloy composed of substantially 34 percent copper, substantially 50 percent silver, and substantially 16 percent cadmium.

21. The process according to claim 14 in which the material of which the shells and conduits is composed has a high thermal conductivity substantially that of pure copper, and in which the braze material is additionally characterized as having a high thermal conductivity substantially 84 percent of that of pure copper.

22. A process according to claim 14 including the additional step of adding a brazing flux.

23. A process according to claim 1 including the additional step of adding a brazing flux.

24. The process according to claim 14 in which the shells and conduits are composed of copper, and in which the braze material is additionally characterized as being maintained in liquefied form at a sufficient temperature and for a sufficient period of time to form a bond with portions of the copper shells and copper conduits, but not to dissolve any conduit to a degree whereby the braze material flows into the conduit.

25. A process according to claim 1 in which the material of the shells and conduits is silver.

26. The process according to claim 1 in which the material of the shells and conduits is any metal having a high thermal conductivity of the order of that of pure copper.

27. A process according to claim 14 where the use of flux is eliminated by using a controlled atmosphere furnace.

28. A process according to claim 14 including the additional step of inserting a plurality of spacers in the spaces between adjacent conduits.

29. A process according to claim 28 wherein the spacers are placed in position before the inner shell is placed in position.

30. A process according to claim 28 wherein the spacers are placed in position after the inner shell is placed in position.

31. A process according to claim 14 in which the material of the shells and conduits is silver.

References Cited

UNITED STATES PATENTS

| | | | |
|---|---|---|---|
| 1,722,025 | 7/1929 | Wagener | 29—500 XR |
| 3,129,502 | 4/1964 | Olson | 29—471.1 |
| 3,197,859 | 8/1965 | Cape | 29—501 |
| 3,368,018 | 2/1968 | De Corso et al. | 219—75 XR |
| 3,373,482 | 3/1968 | Miller | 29—501 |

JOHN F. CAMPBELL, Primary Examiner

R. B. LAZARUS, Assistant Examiner

U.S. Cl. X.R.

29—471.1, 473.3, 502